United States Patent [19]

Frazer

[11] Patent Number: 5,076,377
[45] Date of Patent: Dec. 31, 1991

[54] STEERING SYSTEM FOR VEHICLES

[75] Inventor: Hugh I. Frazer, Lower Portland, Australia

[73] Assignee: Ifield Engineering Pty. Limited, New South Wales, Australia

[21] Appl. No.: 535,222

[22] Filed: Jun. 8, 1990

Related U.S. Application Data

[63] Continuation of Ser. No. 94,733, Aug. 18, 1987, abandoned.

[30] Foreign Application Priority Data

Nov. 11, 1985 [AU] Australia ............................... PH3350

[51] Int. Cl.$^5$ ............................................. B62D 11/02
[52] U.S. Cl. ..................................... 180/6.48; 180/6.3
[58] Field of Search ...................... 180/6.48, 6.44, 6.2, 180/6.3, 6.38, 6.54, 6.62, 6.66, 6.7, 371, 372, 375; 475/18, 19; 91/506; 60/456

[56] References Cited

U.S. PATENT DOCUMENTS

| | | | |
|---|---|---|---|
| 1,984,830 | 12/1934 | Higley | 180/6.44 |
| 2,336,911 | 12/1943 | Zimmermann | 180/6.44 |
| 2,377,354 | 6/1945 | Merritt | 75/665 Q |
| 2,518,578 | 8/1950 | Tomlinson | 60/447 |
| 2,730,182 | 1/1956 | Sloane | 180/6.44 |
| 2,874,591 | 2/1959 | Thoma | 475/24 |
| 2,941,609 | 6/1960 | Bowers et al. | 180/6.48 |
| 3,081,647 | 3/1963 | Blenkle | 475/23 |
| 3,177,964 | 4/1965 | Anderson | 180/307 |
| 3,199,286 | 8/1965 | Anderson | 60/420 |
| 3,349,860 | 10/1967 | Ross | 180/6.44 |
| 3,461,744 | 8/1969 | Booth | 475/23 |
| 3,590,658 | 7/1971 | Tuck | 475/24 |
| 3,815,698 | 6/1974 | Reed | 180/6.48 |
| 4,129,063 | 12/1978 | Ifield | 91/506 |
| 4,174,762 | 11/1979 | Hopkins et al. | 180/6.44 |
| 4,174,763 | 11/1979 | Hopkins et al. | 180/6.48 |
| 4,189,919 | 2/1980 | Goscenski, Jr. | 60/456 X |
| 4,393,952 | 7/1983 | Schreiner | 180/6.44 |
| 4,431,073 | 2/1984 | Nagao et al. | 180/6.48 |
| 4,600,068 | 7/1986 | Lenhard-Backhaus | 180/6.7 X |

FOREIGN PATENT DOCUMENTS

| | | | |
|---|---|---|---|
| 2100038 | 1/1981 | Fed. Rep. of Germany | 180/6.48 |
| 3241793 | 5/1984 | Fed. Rep. of Germany | 180/6.2 |
| 968229 | 10/1982 | U.S.S.R. | 180/6.48 |
| 941735 | 11/1963 | United Kingdom . | |
| 945425 | 12/1963 | United Kingdom . | |
| 2084702A | 4/1982 | United Kingdom . | |
| 8607324 | 12/1986 | World Int. Prop. O. | 180/6.2 |
| 8705574 | 9/1987 | World Int. Prop. O. | 180/6.48 |

Primary Examiner—Mitchell J. Hill
Attorney, Agent, or Firm—Armstrong, Nikaido, Marmelstein, Kubovcik & Murray

[57] ABSTRACT

A transmission for a skid-steering vehicle having two tracks or two sets of wheels in which power is transferred from one or more prime movers to the tracks or wheels through a gearbox is proportional to the sum of the input speeds and the difference between the output speeds is proportional to the difference between the input speeds, the internal gearing of the gearbox consisting of two only differential gearing sets each comprising three elements within connections between two of the elements of one of the differential set with two of the elements of the other differential set. A fully hydraulic drive is preferably provided between the prime mover and hydraulic motors driving the gearbox.

5 Claims, 2 Drawing Sheets

STEERING SYSTEM FOR VEHICLES

This application is a continuation of application Ser. No. 094,733 filed Aug. 18, 1987 now abandoned.

BACKGROUND OF THE INVENTION

This invention relates to skid-steering vehicles such as tractors and military tanks where the vehicle is driven by two ground engaging members which may be two tracks or two sets of wheels, placed on each side of the vehicle, and steered by an imposed difference in speeds of the tracks or sets of wheels.

The present invention provides a transmission consisting of prime movers, hydraulic pumps, hydraulic motors, associated circuitry and a gear box that provides new capabilities in such skid-steering vehicles both in improved high speed performance and in improved vehicle lay-out and control characteristics while still meeting necessary space and weight criteria.

Many low speed tractors and the like have separate hydraulic motors driving each track through gearing to provide both steering and traction. However, they are inherently limited in speed, for any reasonable input power, because steering requires that the tracks or sets of wheels be skidded at any speed, and the power needed to skid the tracks or sets of wheels is excessive at high vehicle speeds.

High speed skid-steer vehicles, such as those used for military applications, overcome this problem by using differential epicyclic gearing 'superposed' on the drive train to each track or set of wheels with one element of each such differential being independently driven by, commonly, a hydraulic motor to provide steering. Usually the input drive is connected to the annulus gear of both differential epicyclic gear sets, while the output to the tracks or sets of wheels is connected to the planet frame, the steering input being connected to the sun gear.

During turning at speed, the required torque difference is generated to skid the tracks or sets of wheels, with the turning power, often many times the drive power, being almost entirely transmitted directly from the inside track or set of wheels to the outside track or set of wheels through the superposed gears, the drive transmission continuing only to transmit drive power from the prime mover.

Typically, such a transmission would consist of a mechanical, hydrokinetic-mechanical or hydrostatic-mechanical transmission connecting the prime mover to both annuli for traction purposes. The prime mover also drives a hydraulic pump which in turn drives a hydraulic motor driving the two sun gears, through gearing in opposite directions. If the motor is held stationary, the track or wheel set speeds will be equal and the vehicle will tend to travel in a straight line. If the motor is rotated, a speed difference will be superimposed on the tracks or sets of wheels causing the vehicle to turn.

Another variety of turn control described in the patent literature, but to the inventor's knowledge not used in practice, attaches a hydraulic pump/motor to one element of each of the superposed epicyclic gears, without an engine driven pump, thus providing a torque and speed ratio between these elements. Such an arrangement would not provide the same ease of control as the more common system described in the previous paragraph.

These basic drive and steering systems, with many detailed variations are described in many patents, the most relevant to the present invention are:

| | | | |
|---|---|---|---|
| U.S Pat. No. | 1,984,830 Higley | U.S Pat. No. | 2,336,911 Zimmermann |
| U.S Pat. No. | 2,377,354 Merritt | U.S Pat. No. | 2,518,578 Tomlinson |
| U.S Pat. No. | 2,730,182 Sloane | U.S Pat. No. | 2,874,591 Thoma |
| U.S Pat. No. | 3,081,647 Blenke | U.S Pat. No. | 3,177,964 Anderson |
| U.S Pat. No. | 3,199,286 Anderson | U.S Pat. No. | 3,349,860 Ross |
| U.S Pat. No. | 3,461,744 Booth | U.S Pat. No. | 3,590,658 Tuck |
| U.S Pat. No. | 3,815,698 Bradley | U.S Pat. No. | 4,174,762 Hopkins |
| U.S Pat. No. | 4,393,952 Schreiner | GB | 941,735 |
| GB | 945,425 | GB | 2,084,702 |

SUMMARY AND GENERAL DESCRIPTION OF THE INVENTION

This invention can be applied to provide a high speed drive and steer system with all the power being transmitted hydraulically. All-hydraulic power is known for low speed drives without a superposing gear system, and split hydrostatic-mechanical drives are known for high speed drives, with full hydraulic steering. However, until now, full hydraulic drives were always too heavy and bulky to be competitive with mechanical, hydrokinetic-mechanical or hydrostatic-mechanical drives.

For example, taking a transmission suitable for a 18,000 kg high speed military vehicle, the complete hydraulic system weight (not including the superposing gearing) using a conventional drive system with drive pump and motor and separate steer pump and motor is estimated as being 740 kg. On the other hand, a transmission according to the invention would have a hydraulic system estimated weight of only 440 kg; providing a 40% weight saving with a corresponding reduction in size.

A full hydraulic drive as provided by the invention allows great flexibility as to the vehicle arrangement as the prime mover can be positioned anywhere in the vehicle and simply connected to the final drive with conduits. It will be shown that the invention allows the vehicle to be driven by a number of prime movers, which can be of different types, situated wherever convenient in, or indeed external to, the vehicle.

The prime movers are typically diesel engines, but can be gasoline engines, gas or steam turbines, electric motors or any other known kind of similar device. Inherent in the use of a full hydraulic drive is the smooth stepless change of drive ratio to suit speed and traction requirements, as compared with the step changes that occur with any geared transmission.

The invention uses a superposing gearbox that allows for two identical inputs, as against a single power input with a separate steering input. The characterizing property of such gearing is that it provides a drive ratio such that the sum of the two outputs is proportional to the sum of the inputs, and a steering ratio such that the difference of the outputs is a proportion of the difference of the inputs. The two ratios can be separately adjusted by selection of the internal gearing ratios.

Thus, it both inputs have the same speed, both outputs will have the same speed. If the inputs are at different speeds, the outputs will also be at different speeds, but conforming to the equations set out below.

DEFINITIONS
DRATIO=(LIN+RIN)/(LON+RON)
SRATIO=(LIN−RIN)/(LON−RON)
THEN
LIN=((LON+RON) *DRATIO+(LON−RON) *SRATIO)/2
RIN=((RON+LON) *DRATIO+(RON−LON) *SRATIO)/2
LOT=((LIT+RIT) *DRATIO+(LIT−RIT) *SRATIO)/2
ROT=((RIT+LIT) *DRATIO+(RIT−LIT) *SRATIO)/2
WHERE
DRATIO=DRIVE RATIO
SRATIO=STEER RATIO
LIN, RIN=LEFT, RIGHT INPUT SPEEDS
LON, RON=LEFT, RIGHT OUTPUT SPEEDS
LOT, ROT=LEFT, RIGHT OUTPUT TORQUES
LIT,LOT=LEFT, RIGHT INPUT TORQUES
(TORQUE CALCULATIONS ASSUME 100% EFFICIENCY)

Such a gearbox can be made by combining, in various ways, two or more differential gear sets. The term 'differential gear' is taken to include all forms of gear assemblies that provide a differential action between three elements, such that the speed of any one element is dependent on the speed of the other two. One example is the differential commonly used in the axles of automobiles. In this case the differential casing, on which the crown wheel is mounted, is one element with the two bevel gears connected to the axles being the other two elements. A second example is an epicyclic gear set where the sun gear, the annulus gear and the planet frame represent the three differential elements. There are other forms of differential gearing known to those skilled in the art.

The simplest of these gear boxes, and claimed to be novel by the inventor, uses only two differential gear sets, as shown in one preferred embodiment, using differentials of the epicyclic type, as a diagram on FIG. 1, which is described below. Other embodiments either interconnect other elements of the epicyclics, with internal ratios adjusted to suit, or use other forms of differential gearing.

The invention thus consists in a transmission for a skid-steering vehicle having two ground engaging members, the gearbox consisting of a first input receiving member and a second similar input receiving member internal gearing connecting said input receiving members respectively to a first output member and a second output member through which said ground engaging members are driven, the internal gearing being arranged and constructed so that the sum of rotational speeds of said output member is proportional to the sum of the rotational speeds of said input members and the differece between the rotational speeds of said output members is proportional to the difference in rotational speeds of said input members characterized in that the internal gearing consists of two only differential gearing sets each comprising three elements with interconnections between two of the elements of one said differential set with two of the elements of said second differential set.

The invention further consists in a transmission for a skid steering vehicle having two ground engaging members including a gearbox having two output members through which said ground engaging members are driven and two input members, the gearbox being constructed and arranged so that the sum of the rotational speeds of the output members is proportional to the sum of the rotational speeds of the input members and the difference between the rotational speeds of the output members is proportional to the difference between the rotational speeds of the input members characterized in that the input members are each driven by a hydraulic motor.

DETAILED DESCRIPTION OF THE INVENTION

In order that the invention may be better understood and put into practice a preferred form thereof is hereinafter described, by way of example, with reference to the accompanying drawings in which.

Figure 1:
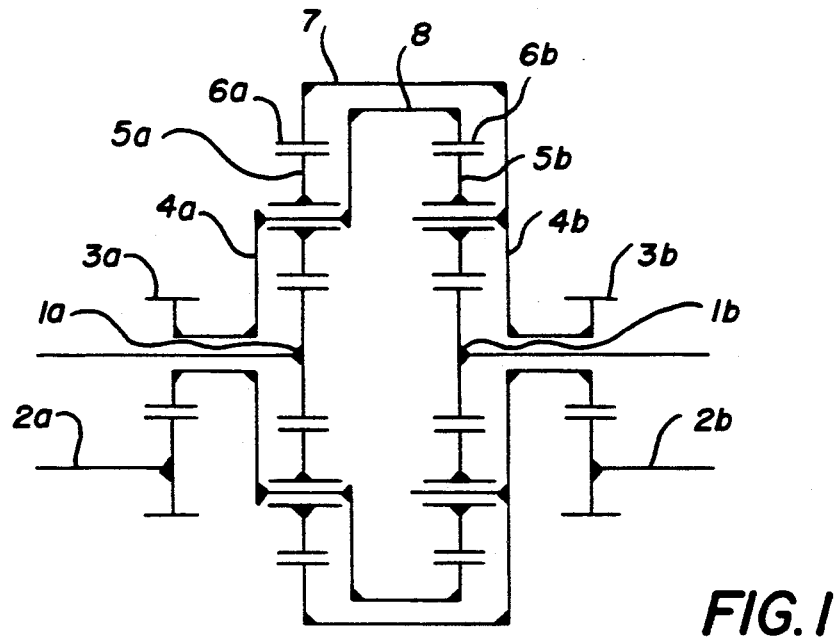
FIG. 1 illustrates diagrammatically a gearbox for use in a transmission according to the invention.

Referring to FIG. 1, the input receiving members or gears 1a,1b act as the sun gears of the differentials and drive the planet gears 5a,5b. These planet gears are mounted in planet frames 4a,4b and also mesh with the annulus gears 6a,6b. The planet frames 4a, 4b also carry gears 3a,3b which drive the output receiving member or shafts 2a,2b. The annulus gear 6a is torsionally connected to the planet frame 4b by connecting member 7. Similarly the annulus 6b is torsionally connected to planet frame 4a by connecting member 8, thus the two elements of one differential are connected to two elements of the other.

If the sun gears on the input shafts have N1 teeth, the epicyclic annulus gears N2 teeth, the gears 3a,3b N3 teeth, and the gears on the output shaft have N4 teeth, then the characteristic ratios of the gearbox can be calculated as follows:

DRIVE RATIO=N4/N3
STEER RATIO=N3 (2(N2/N1)+1)/N4

Figure 2:
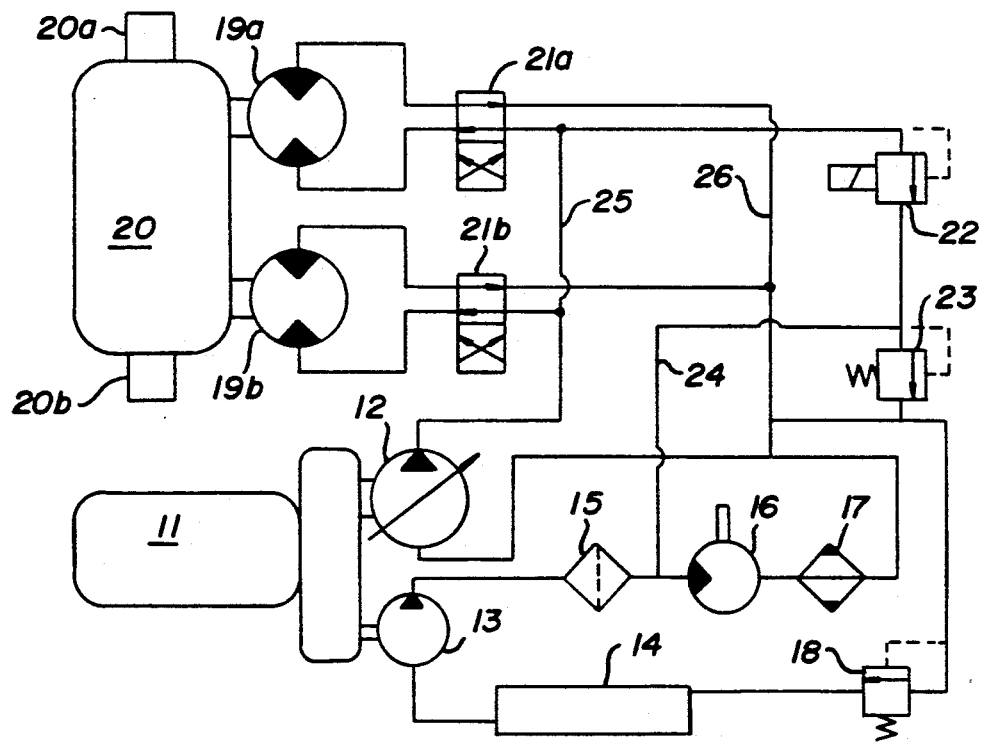
FIG. 2 shows diagrammatically a transmission according to the invention.

FIG. 2 shows a diagram of a preferred embodiment of the transmission according to the invention. This diagram only shows the main features of the transmission and many details, as used by a designer skilled in the art, are omitted for the sake of clarity.

A prime mover 11 drives a main transmission hydraulic pump 12 and an auxiliary pump 13. The auxiliary pump draws fluid from reservoir 14 and delivers fluid through filter 15 to fan motor 16 and then through cooler 17. The fluid then enters the low pressure side of the main power loop, pressurizing the low pressure side of the loop to a pressure set by relief valve 18, which discharges back to the reservoir 14.

The main pump pumps draws fluid from the low pressure side of the loop and pumps it as high pressure fluid through the reversing valves 21a, 21b to the drive motors 19a, 19b. The fluid then returns, again through the reversing valves, to the inlet of the pump.

The pressure in the main loop is limited by the relief valves 22, 23. Relief valve 23 also acts to limit the pressure on the fan motor 16 because of the conduit 24. When relief valve 22 is bypassing flow, some or all of its discharge may pass down conduit 24 to the fan motor and cause it to rotate at greater speed.

The two motors 19a,19b drive the gearbox 20 with output shafts 20a,20b. This gearbox may be of the type shown in FIG. 1.

The motors are variable displacement, controlled preferably by a microprocessor based hydro-electronic control system, not shown, although other control means, such as hydro-mechanical, may be used. The control system senses the demand drive and steering commands and adjusts the displacement of the motors together to provide the necessary output drive torque characteristic, and differentially to provide the necessary steering characteristic.

Because varying the motor displacements varies the output torque of the motors, and does not directly vary their speed, a closed loop control system is required to adjust automatically the displacements, and thus the torques, to provide the demand difference in speed required for turning. For this reason, the control complexity is greater than would be provided if each motor were to be of fixed displacement and each driven by a separate pump. However, with the availability of microprocessors, control complexity is of less importance than in previous times, and a number of advantages accrue from the use of a single pump.

Firstly, the number of components is obviously reduced.

Secondly, because, during turning, all power may have to go to one motor, each pump would have to be substantially the same size as the single pump, with increases in size and weight if two pumps are used.

Thirdly, only two main conduits are required if a single pump is used. This not only reduces the piping complexity, but is a considerable advantage if more than one prime mover is used.

Figure 4:
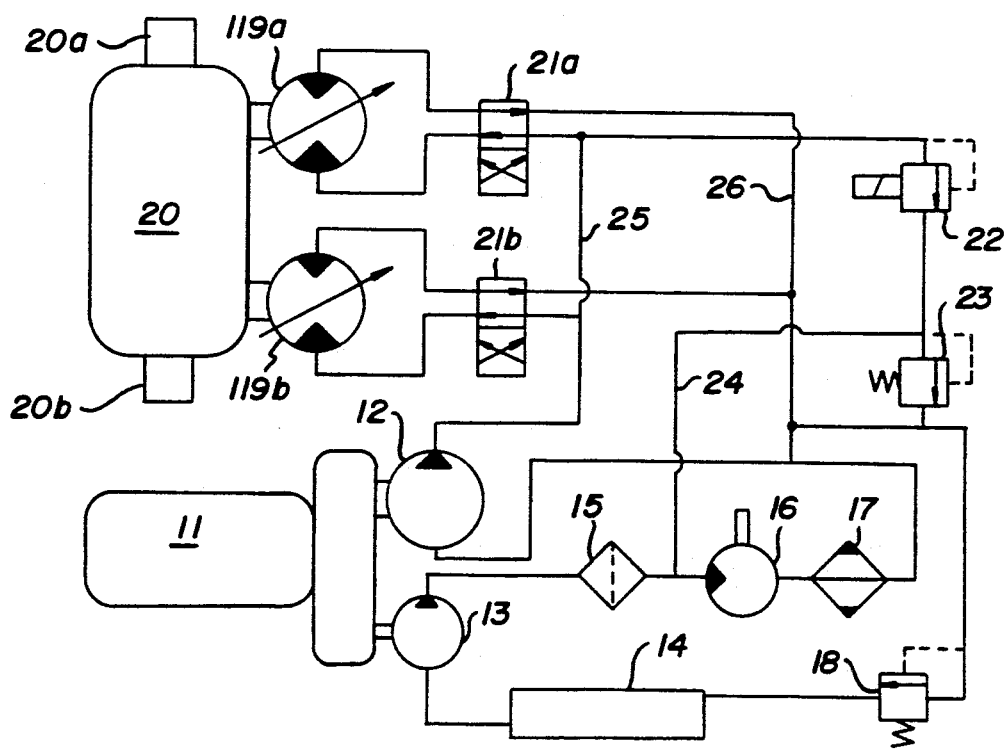

In any event, the use of variable displacement motors 119a, 119b, as can be seen in FIG. 4, allows a much wider speed range in the hydraulic transmission as variable motors typically have an increased speed capability of up to 50% at reduced displacement, as compared with a fixed displacement motor.

Conventional wisdom would teach the use of over-centre motors so that the torque on one side can be reversed for tight turns by swinging that motor over-centre into reverse.

(The term 'over-centre' describes the capability of some designs of hydraulic pumps and motors to have their displacement varied from a maximum value through zero to a negative maximum value, such negative value usually having the same magnitude as the positive maximum value. In a swash-plate design this is achieved by swinging the swash plate from its maximum forward angle, through to zero and then further 'over-centre' to its maximum reverse angle. The effect in a pump is to reverse the direction of flow through the pump, while in a motor the direction of output rotation is reversed. Other designs of pumps and motors do not have this capability and are designated as one-side-of-centre units.)

The following is a table of the manufacturers and the locations thereof of typical units for the above-described 'over-centre' and 'one-side-of-centre' pumps and motors:

| Manufacturer | Location | Model Number |
| --- | --- | --- |
| 1. Sundstand | Iowa, U.S.A. | Series PV25 |
| 2. Abex Denison | Ohio, U.S.A. | Series 8 |
| 3. Volvo | Troll Hattan, Sweden | V11-110 or V30D |
| 4. Ifield Engineering Pty. Ltd. | Sydney, Australia | V150 |

However, in a preferred form of the invention separate reversing valves 21a, 21b on each motor are used for the following reasons.

Firstly, this allows the use of motors that only swing one side of centre. Such motors are inherently more compact and are usually more efficient as the bent axis type of motor can be more readily used. In addition, it is known that such motors can be configured so that the clearance volume is held substantially constant over the displacement range by pivotting the axis off-centre (see Ifield U.S. Pat. No. 4,129,063).

Secondly, the reversing valves can be operated much more quickly than a motor can be swung over-centre which is important when a sudden turn is required. The transition from drive to over-run while turning also requires a sudden change in torque direction. Additionally, the ability to suddenly apply hydraulic braking is an advantage.

Thirdly, conventional wisdom would teach the use of an over-centre pump for reverse drive. However, the reversing valves allow a pump of one-side-of-centre design to be used as reverse can be achieved by operating both valves simultaneously. As already described for the motors, such a pump can be much more compact and can be more efficient than an over-centre pump.

Fourthly, if braking and reverse is to be provided by operating the reversing valves, only one of the main conduits 25 need ever be at high pressure. The other conduit 26 can be at low pressure under all circumstances. This allows for one conduit of lighter construction and considerably simplifies the overall hydraulic circuitry as the boost inlet and discharge valves normally needed for over-centre operation are not required.

Braking is then done against the braking relief valve 22, which is shown as electrically controlled. Operation of the brake pedal will, perhaps through the microprocessor control system, cause an increasing signal with increasing pedal depression. Such control could also be provided mechanically or hydraulically.

It should be understood that, because the pump is not capable of over-centre operation and because only one conduit is ever pressurized, the braking energy cannot be absorbed by over-running the engine. All the hydraulic braking energy passes into the working fluid across the relief valve 22. This would cause overheating of the fluid so it is necessary to increase the fan speed and the flow through the cooler.

This could be done by increasing the engine speed with the microprocessor controller, but can also be achieved automatically with the circuitry shown on FIG. 2. As long as fluid is passing through relief valve 22, it is available to increase the speed of the fan motor 16 and then passes through the cooler 17, up to a pressure limited by relief valve 23.

The embodiment of the invention shown on FIG. 2 thus provides for full hydraulic drive using compact and efficient pumps and motors, with minimum circuitry and pipework, and provides for rapid steering and braking response.

Figure 3:
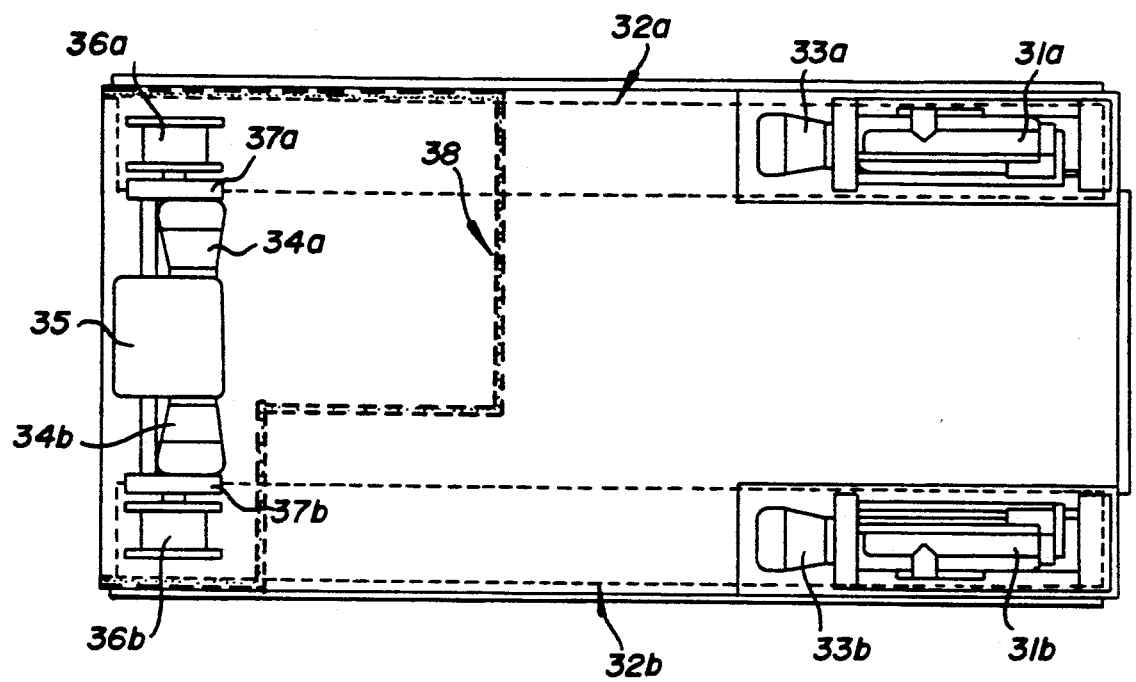
FIG. 3 is a diagrammatic plan view of a vehicle incorporating a transmission according to the invention and FIG. 4 shows diagrammatically a transmission according to this invention which employs variable displacement motors.

FIG. 3 shows a diagrammatic plan view of a typical military armoured personnel carrier, with the roof removed, with the transmission according to the invention using two diesel engines as prime movers. It is seen that the prime movers 31a, 31b fit into the rear corners of the vehicle, above the tracks 32a, 32b, in a space that otherwise has limited utility.

Hydraulic pumps 33a, 33b are mounted on each engine and connected through conduits (not shown) to the two hydraulic motors 34a, 34b. According to the invention both pumps are connected to both motors in parallel.

The two hydraulic motors are mounted on the gearbox 35, mounted at the front of the vehicle, which drives the track sprockets 36a, 36b through final reduction gearing 37a, 37b.

A conventional arrangement with one engine and mechanical power transmission requires that the engine and complete transmission be at the front of the vehicle and takes up considerable valuable floor space. This space is shown as outline 38. The weight distribution of the vehicle is also adversely effected with a degradation in vehicle performance, particularly when braking or when on water.

The dual engine scheme, according to the invention, also allows operation, at half power, on one engine only, still with full tractive force capability. This means that both engines have to fail before the vehicle is immobilized. The vehicle is quieter with only one engine operating which can be an advantage under ambuscade conditions. The two smaller engines can fall more readily into the mass production range of engines, with a result that the two engines can be cheaper than one large one. Also, in times of conflict, it would be possible to use any number of high production gasoline engines as is necessary to provide the required vehicle performance.

While the invention has been particularly shown and described in reference to preferred embodiments thereof, it will be understood by those skilled in the art that changes in form and details may be made therein without departing from the spirit and scope of the invention.

I claim:

1. A transmission for a skid-steering vehicle comprising two ground engaging members and a gearbox, the gearbox including a first input receiving member, a second similar input receiving member, a first output member, a second output member, said first and second output members driving said ground engaging members, and internal gearing means for connecting said input receiving members respectively to said output members and being arranged and constructed so that the sum of rotational speeds of said output members is proportional to the sum of the rotational speeds of said input members and the difference between the rotational speeds of said output members is proportional to the difference in rotational speeds of said input members, said internal gearing means consisting of first and second differential gearing sets, each of said first and second differential gearing sets including first, second and third gear elements, wherein said first and second gear elements of said first differential gearing set is operably connected through a first connecting member to said third gear element of said second differential gearing set, and wherein said first and second gear elements of said second differential gearing set is operably connected through a second connecting member to said third gear element of said first differential gear set.

2. A transmission for a skid steering vehicle, comprising:
two ground engaging members including a gearbox means having two output members through which the ground engaging members are driven and two input members, the gearbox means for providing a sum of the rotational speeds of the output members which is proportional to a sum of the rotational speeds of the input members and a difference between the rotational speeds of the output members which is proportional to a difference between the rotational speeds of the input members;
two hydraulic motors which are variable in displacement, the two hydraulic motors respectively driving the input members of the gearbox means;
at least one variable displacement pump having conduits for driving the two hydraulic motors;
at least one prime mover for driving the variable displacement pump; and
a separate reversing valve on each of the hydraulic motors for controlling a direction of torque application of the hydraulic motors,
wherein one of the conduits of the variable displacement pump is at high pressure, and another one of the conduits of the variable displacement pump is always at low pressure.

3. A transmission as claimed in claim 2 wherein the two hydraulic motors are driven by a single variable displacement one-side-of-centre pump driven by a single prime mover.

4. A transmission as claimed in claim 2 wherein the two hydraulic motors are driven by a plurality of variable displacement one-side-of-centre pumps each driven by a different prime mover.

5. A transmission as claimed in claim 2 further comprising means for braking of the vehicle controlled by a pressure relief valve and, means for causing a cooling fan hydraulic motor to increase in speed and causing flow through a hydraulic fluid cooler to increase upon discharge from the braking relief valve.

* * * * *

UNITED STATES PATENT AND TRADEMARK OFFICE
CERTIFICATE OF CORRECTION

PATENT NO. : 5,076,377
DATED : December 31, 1991
INVENTOR(S) : Hugh I. FRAZER

It is certified that error appears in the above-identified patent and that said Letters Patent is hereby corrected as shown below:

On the cover page, delete "Item [22]" and insert therefor:

-- [22] PCT Filed:      Oct. 29, 1986

[86] PCT No.:        PCT/AU86/00322

§ 371 Date:     Aug. 18, 1987

§ 102(e) Date:  Aug. 18, 1987

[87] PCT Pub. No.:   WO87/02952

PCT Pub. Date:  May 21, 1987 --.

Signed and Sealed this

Twenty-fifth Day of May, 1993

Attest:

MICHAEL K. KIRK

Attesting Officer     Acting Commissioner of Patents and Trademarks